United States Patent
Quinqueneau et al.

(10) Patent No.: US 9,546,787 B2
(45) Date of Patent: Jan. 17, 2017

(54) DEVICE FOR STABILIZING DILUTE COMBUSTION IN A COLD-WALL COMBUSTION CHAMBER

(75) Inventors: Alain Quinqueneau, Maisons Lafitte (FR); Clotilde Villermaux, Courbevoie (FR); Mathieu Ourliac, Saint Souplets (FR); Mechline Ayoub, Sotteville les Rouen (FR); David Honore, Rouen (FR)

(73) Assignee: GDF SUEZ, Courbevoie (FR)

(*) Notice: Subject to any disclaimer, the term of this patent is extended or adjusted under 35 U.S.C. 154(b) by 395 days.

(21) Appl. No.: 14/342,351

(22) PCT Filed: Aug. 13, 2012

(86) PCT No.: PCT/EP2012/065816
§ 371 (c)(1),
(2), (4) Date: Apr. 16, 2014

(87) PCT Pub. No.: WO2013/029977
PCT Pub. Date: Mar. 7, 2013

(65) Prior Publication Data
US 2014/0227648 A1  Aug. 14, 2014

(30) Foreign Application Priority Data
Sep. 1, 2011 (FR) .................... 11 57737

(51) Int. Cl.
*F23C 5/08* (2006.01)
*F23L 15/00* (2006.01)
(Continued)

(52) U.S. Cl.
CPC .............. *F23L 15/00* (2013.01); *F23C 5/08* (2013.01); *F23C 9/006* (2013.01); *F23C 9/08* (2013.01);
(Continued)

(58) Field of Classification Search
CPC ............................................. F23C 2900/9901
(Continued)

(56) References Cited

U.S. PATENT DOCUMENTS 3,190,071 A * 6/1965 Negre .................... F02C 7/266
431/208
3,461,824 A * 8/1969 Eilif ........................ F23G 5/04
110/215
(Continued)

FOREIGN PATENT DOCUMENTS

EP  0698764 A2  2/1996
EP  1048901 A1  11/2000
(Continued)

*Primary Examiner* — Avinash Savani
(74) *Attorney, Agent, or Firm* — Im IP Law; C. Andrew Im (57) ABSTRACT

A device for stabilizing dilute combustion for use in a cold-walls type combustion chamber comprises a burner. The burner comprises at least one oxidant inlet and at least one fuel inlet. The oxidant and fuel inlets opening separately into the chamber at a distance suitable for establishing combustion which is highly diluted by internal re-circulations of combustion products toward a burner zone. The device comprises a heating element configured to heat, during steady operating conditions, the combustion products to sustain self-ignition conditions. The heating element is positioned in a dilution zone and surrounds a set of oxidant and fuel jets.

13 Claims, 3 Drawing Sheets (51) Int. Cl.
*F23C 9/00* (2006.01)
*F23C 9/08* (2006.01)
*F23C 99/00* (2006.01)

(52) U.S. Cl.
CPC ..... *F23C 99/00* (2013.01); *F23C 2900/99001* (2013.01); *Y02E 20/342* (2013.01)

(58) Field of Classification Search
USPC .......................................... 431/115, 181, 208
See application file for complete search history.

(56) References Cited

U.S. PATENT DOCUMENTS

| | | |
|---|---|---|
| 5,154,599 A | 10/1992 | Wunning |
| 5,407,347 A | 4/1995 | Bortz |
| 6,485,289 B1 | 11/2002 | Kelly et al. |
| 6,869,277 B2 | 3/2005 | Stephens |
| 2009/0136406 A1 | 5/2009 | Johnson et al. |

FOREIGN PATENT DOCUMENTS

| | | |
|---|---|---|
| EP | 1850067 A2 | 10/2007 |
| EP | 2085698 A1 | 8/2009 |
| WO | 03/091626 A1 | 11/2003 |

\* cited by examiner

DEVICE FOR STABILIZING DILUTE COMBUSTION IN A COLD-WALL COMBUSTION CHAMBER

RELATED APPLICATIONS

This application is a §371 application from PCT/EP2012/065816 filed Aug. 13, 2012, which claims priority from French Patent Application No. 1157737 filed Sep. 1, 2011, each of which is herein incorporated by reference in its entirety.

TECHNICAL FIELD OF THE INVENTION

The present invention concerns a device for stabilizing dilute combustion in a combustion chamber: it applies, in particular, to high environmental performance, energy-efficient combustion technologies for combustion chambers known as "cold-wall" chambers, wherein the skin temperature of the walls containing the load is of the order of or less than 1,000 K, such as refining furnaces or industrial furnaces.

BACKGROUND OF THE INVENTION

Most combustion methods are confronted by unwanted emissions of nitrogen oxides (NOx) in the combustion fumes. Nitrogen oxides have adverse effects on human beings and on the environment. For example, they are responsible for acid rain and play a significant role in the formation of atmospheric ozone.

European regulations are moving towards a substantial reduction in nitrogen oxide emissions. Because of this, manufacturers of combustion equipment, in particular burners, are constantly striving to limit nitrogen oxide emissions as much as possible. In 2011, according to the European LCP Directive (no. 2001-80-EC), the nitrogen oxide emission limit values ("ELV") for large combustion plants were fixed at 200 mg/Nm$^3$ at 3% $O_2$ for existing industrial furnaces and 100 mg/Nm$^3$ at 3% $O_2$ for new furnaces. It is very likely that these ELVs will be reduced in the years to come.

There are many chemical pathways for the formation of nitrogen oxides. For natural gas combustion in furnaces, the two main contributors are thermal nitrogen oxides (Zeldovich mechanism) and prompt nitrogen oxides (Fenimore mechanism). The rate of thermal nitrogen oxide production is very dependent on the temperature. Formation increases significantly when the temperature in the reaction zone exceeds 1,500 K. As well as being dependent on the temperature, thermal nitrogen oxide formation is also dependent on the residence time in the hot zones.

Generally, given the relative contributions of the two types of nitrogen oxide formation, the initial focus is on reducing thermal nitrogen oxides, then the effect of the modifications on the prompt nitrogen oxides is observed.

Nitrogen oxide reductions can be achieved by means of two principles, referred to as "primary methods" and "secondary methods". The primary methods consist of preventing the formation of nitrogen oxides, while the secondary methods are aimed at destroying the nitrogen oxides formed. The secondary methods have the disadvantages of high implementation costs for the reduction method, high levels of ammonia releases and decreased robustness for the plant.

Thus, the primary methods seem preferable. Most low nitrogen oxide emission furnace burners are based on non-premixing of the air and/or fuel (e.g. as described in U.S. Pat. No. 6,485,289). In this architecture, two reaction zones are created: a first rich zone, supplying the energy required to stabilize a second, lean, zone, diluted by the internal circulation of combustion products. A technology to further improve the performance of low nitrogen oxide emission burners consists of using an external recirculation of the combustion products. The combustion air is then pre-diluted with fumes (approximately 30% of the flow of fumes in the flue). This makes it possible to reduce the oxygen content in the oxidant flow and thus reduce the temperature peak and the thermal nitrogen oxides. U.S. Pat. No. 6,869,277 can be cited. However, these systems are complex, expensive and require frequent maintenance. For these reasons they are not installed very often.

Flameless combustion, also called "dilute combustion", is a type of combustion making it possible to limit the temperature peaks, and thus to substantially reduce nitrogen oxide emissions. This combustion is based on an intense dilution of the oxidant and fuel jets by means of internal recirculations of products of combustion, generated by the jets of oxidant and fuel which are injected separately using high velocities. The dilution makes it possible to switch from an intense localized combustion to a more moderate combustion intensity. The high temperature of the products used as diluent allows the stability of this mode of combustion to be ensured. This type of combustion is characterized by a large-size heat emission zone, uniform temperature at the flame front, much lower temperature peaks and much smaller temperature fluctuations than in traditional combustion, reduced nitrogen oxide emissions and a much weaker link between acoustic waves and heat emission.

U.S. Pat. No. 5,154,599 describes an example of a flameless combustion burner. This document presents a regenerative burner architecture, i.e. the fumes are aspirated by the burner, their energy is stored in a heat reservoir and then transferred to the combustion air so as to heat it up to 1,200 K. Dilution of the reagents before combustion is ensured by having a considerable distance between the air and fuel injection points (at least twice the diameter of the central injector) and a high flow rate for fumes that recirculate (recirculation ratio greater than two for natural gas).

This technology is implemented industrially in methods known as "hot", i.e. methods where the average temperature of the chamber is much higher than the self-ignition temperature of the fuel in question. Flameless oxidation is self-sustained by means of the self-ignition of an oxidant/fuel/burnt gasses ternary mixture. For self-ignition to occur, the temperature in the mixing zone must be higher than the self-ignition temperature. There are two possible ways of fulfilling this condition. In the first, at least one of the reagents (typically the oxidant) is preheated by means of energy recovered from the fumes or by means of an external energy source. In the second, internal recirculations of the hot combustion products are used to exceed the self-ignition temperature in the reagents mixing zone. These two stabilization methods are widespread in high-temperature applications (chamber temperature higher than the self-ignition temperature). In effect, in this case the fumes have sufficient energy to enable the fuel and/or the oxidant to be preheated to a high temperature and thus the self-ignition temperature to be exceeded in the mixing zone.

The stability of the dilute combustion, and therefore its sustainability, is jeopardized in "cool-wall" type methods. As the combustion products cool on contact with the walls, they do not let the self-ignition temperature be exceeded in the recirculating oxidant/fuel/combustion products mixing zone. Flameless oxidation, as utilized in high-temperature applications, cannot therefore be extended to cold-wall type chambers.

However, several technologies have been developed, but not yet deployed on an industrial scale, for furnace-type applications, in order to remove this barrier. One can cite stabilizations by means of:

a pilot flame, a catalytic element for lowering the self-ignition temperature, or preheating the combustion air to a high temperature.

Each of these technologies has drawbacks, in terms of cost, performance, complexity and/or reliability.

The problem of flame stabilization in industrial environments is not specific to dilute combustion. For furnace types of chambers, the flame stabilization of "low nitrogen oxide" burners is often based on a primary intense rich combustion zone that helps to stabilize the lean combustion zone, whose characteristics are close (in terms of dilution of the air by combustion products) to those of a flameless combustion. U.S. Pat. No. 5,407,347 can be cited as a modern low nitrogen oxide burner technology. As a dilute combustion application, patent EP 1,850,067, which envisages stabilizing a highly dilute combustion by means of a pilot burner, can be cited. However, this type of stabilization has the inconvenience of creating hot zones that are potentially high nitrogen oxide emitters.

For internal combustion applications, "HCCi" (acronym for Homogeneous Charge Compression Ignition) combustion in gasoline engines, whose properties, in terms of mixing, are those of a dilute combustion, is performed by spark plugs. As an industrial burner operates continuously, spark ignition technology cannot be applied here.

OBJECT AND SUMMARY OF THE INVENTION

This invention aims to remedy all or part of these drawbacks.

To this end the present invention envisages, according to a first aspect, a device for stabilizing dilute combustion in a cold-wall type of combustion chamber, equipped with a burner comprising at least one oxidant inlet and at least one fuel inlet, the oxidant and fuel inlets opening separately into the chamber at a distance suitable for establishing combustion which is highly diluted by internal recirculations of the combustion products towards the burner zone. Said device comprises a heating element designed to heat, during steady operating conditions, the combustion products in order to sustain self-ignition conditions, said heating element being positioned in the dilution zone and surrounding the set of oxidant and fuel jets.

Thanks to these provisions, stabilization of a dilute combustion is enabled. The present device combines many interesting properties for industrial applications, such as very low nitrogen oxide and carbon monoxide emissions, high uniformity of the transfer to the load and reduced intensity of the temperature peaks, a reaction zone well distributed in volume, more uniform heat generation and a flame less sensitive to thermo-acoustic instabilities. Inserting the heating element in the furnace makes it possible, by heating recirculating combustion products, to sustain the self-ignition conditions required for stabilizing the highly dilute combustion locally in the mixing zone.

According to particular features, the heating element comprises an electrical resistance.

According to particular features, the heating element comprises a heating tube supplied with heated products via an auxiliary combustion, products of combustion or intermediary fluid.

According to particular features, the heating element comprises a multi-perforated tube supplied with combustion products.

According to particular features, the heating element is located at the base of the burner.

This heating element heats the combustion products, before they reach the burner zone where they are mixed with, firstly, the oxidant and, secondly, the fuel. The oxidant and fuel are injected separately. Thanks to the fumes being heated by the heating element, the temperature in the fuel/oxidant mixing zone thus exceeds the mixture's self-ignition temperature. The heating element, having heated the combustion products before mixing with the reagents, produces a hot zone (temperature higher than the self-ignition temperature) at the point where the jets of oxidant and fuel meet.

According to particular features, the heating element is designed to maintain the temperature of the heated combustion products in recirculation below the temperature limit for the exponential rise in the rate of thermal nitrogen oxide production.

According to particular features, the device comprises a means of preheating air by recovering the radiative flow emitted by the heating element.

According to particular features, the air preheating means is a heat exchanger located inside the combustion chamber opposite the heating element and designed to recover a portion of the power supplied by the heating element transferred in the form of a radiative flow to the cold walls of the combustion chamber and to transfer, to the oxidant and/or to the fuel, at least a portion of this recovered power.

According to particular features, the air preheating means is a heat exchanger located inside the combustion chamber opposite the heating element and designed to recover a portion of the power supplied by the heating element transferred in the form of a radiative flow to the cold walls of the combustion chamber and to transfer, to a fluid load to be heated, at least a portion of this recovered power.

The stability of the flameless combustion is thus further increased by preheating the oxidant or the fuel, and performance is improved. Finally, the power thus generated by the heating element is recovered in two ways: firstly, by the oxidant via the exchanger and secondly by the fumes in recirculation via a conductive-convective exchange. In addition, the heat exchanger makes it possible to reduce the thermal stress on the cold walls located opposite the heating element. Good uniformity of the heat transfer over the whole of the combustion chamber's heating walls is thus retained.

According to particular features, the air preheating means is a radiative wall located inside the combustion chamber between the heating element and the cold walls.

This radiative wall, or screen, confines the heat to the inside of the heating unit. In this way the radiative heat transfer from the heating element to the opposite walls is limited. The length of this wall must be equal to the height of the heating element. The two key points are the material forming this wall and its diameter.

According to particular features, the oxidant and fuel inlets have injection holes with suitable diameters such that the oxidant and fuel speeds are favorable for utilizing a highly dilute combustion.

According to a second aspect, the present invention envisages a cold-wall type of combustion chamber, which comprises a combustion stabilization device that is the subject of the present invention.

According to a third aspect, the present invention envisages a furnace, which comprises a combustion stabilization device that is the subject of the present invention.

BRIEF DESCRIPTION OF THE DRAWINGS

Other advantages, aims and characteristics of the present invention will become apparent from the description that will follow, made, as an example that is in no way limiting, with reference to the drawings included in an appendix, in which.

DETAILED DESCRIPTION OF THE EMBODIMENTS

Figure 1:
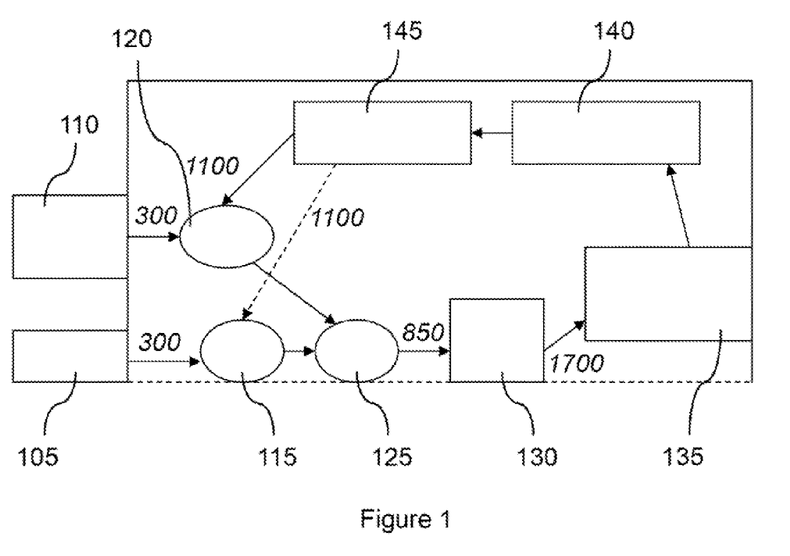
FIG. 1 is a functional diagram of a first embodiment of the device that is the subject of the present invention for utilizing flameless combustion in a cold-wall combustion chamber, with no preheating of the oxidant or fuel.
Figure 2:
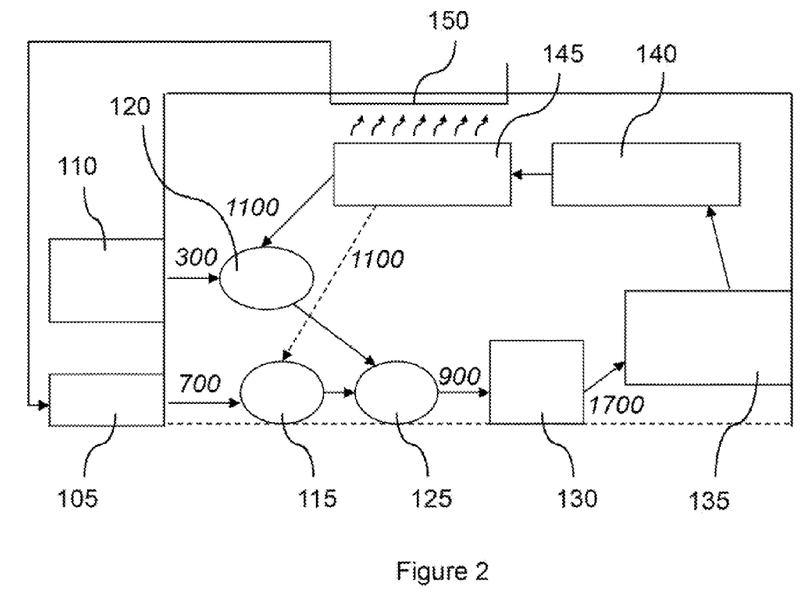
FIG. 2 is a functional diagram of a second embodiment of the device that is the subject of the present invention for utilizing flameless combustion in a cold-wall combustion chamber coupled with a system for recovering the radiative flow emitted by the heating element for the purposes of preheating the oxidant.

FIGS. 1 and 2 show a cold-wall combustion chamber 245 type of installation, for example an industrial gas furnace equipped with a burner and a flue. Generally, the burner permits a plane of symmetry. The chamber permits an axis of symmetry in the case of a fire-tube furnace.

Only the upper half of the installation is shown in FIGS. 1 and 2. The burner proposed here has a simple architecture. The air inlet 105 is located in the center and two fuel injection points 110 are positioned on the periphery. In variants, there are more than two fuel injection points. In variants, the fuel injection point is positioned in the center and oxidant injection points are placed on the periphery. Two important parameters characterize the burner: the distance between the injection holes and the velocities of the fuel and oxidant jets. The distance between the jets of fuel and oxidant must allow these to be mixed with the combustion products that recirculate, cooled on contact with the walls, before the jets of oxidant and fuel meet. Intense recirculations of combustion products are fed by the high velocities on output from the oxidant injector. For instance, for flameless combustion of natural gas, the recirculation ratio, defined as the ratio of the recirculating flow rate to the sum of the injected flow rates, is greater than or equal to four.

FIG. 1 shows that the air enters at a temperature of 300 K (the temperatures of the fluids are indicated, in FIGS. 1 and 2, in italic figures, beside the arrows representing their movements). The air is mixed with the combustion products at a temperature of at least 1,100 K in 115 before being mixed with the fuel, in 125. The fuel enters at a temperature of 300 K and it, also, is mixed with the combustion products in 120. The mixture obtained in 125 has a temperature of 850 K. Combustion occurs in 130 and the combustion products exit at 1,700 K. The heat exchange between the combustion products and the load occurs in 135. A portion of the combustion products performs a recirculation in 140 to return to be mixed with the fuel and the incoming air.

In the cold-wall combustion chambers considered, the temperature of the fumes at the base of the burner is less than 700 K. In this case, the average temperature of the mixture, fuel/oxidant diluted by the fumes, is less than the self-ignition temperature of all the usual fuels. Dilute combustion, sustained by the self-ignition of the mixture, cannot therefore be correctly established.

In the embodiments of the device that is the subject of the invention represented in the figures, a heating element 145 that heats the portion of the fumes that recirculate is positioned to take part in the dilution of the reagents. This heating by the heating element 145 aims to reach, in the fuel/oxidant mixing zone, firstly, a temperature higher than the self-ignition temperature of the fuel considered and, secondly, an oxygen concentration of the order of 5% in the oxidant jet. A stable dilute combustion, sustained by the self-ignition of the mixture of reagents, is therefore established in 130.

The maximum temperature in the reactive zone thus obtained is of the order of 1,700 K. Compared to conventional combustion, this moderate temperature produces a significant reduction in nitrogen oxide emissions. The combustion occurs over a large area and no longer in a concentrated flame. The load to be heated can be water (fire-tube furnace or water-tube furnace) or another liquid product (a refinery's atmospheric distillation furnace, for example). All the fumes that recirculate transfer a significant portion of their energy to the load. The fumes that recirculate up to the level of the mixing zone are therefore heated from 850 K to at least 1,100 K by the heating element.

The skin temperature of the heating element must enable the combustion products that recirculate to be heated sufficiently while not exceeding the temperature limit for thermal nitrogen oxide production. The inventors have determined that a value of 1,200 K represents a good compromise for respecting these two conflicting constraints.

Low temperatures are also obtained for the walls containing the load (water or fluid). In addition, the temperature of the heating element is preferably at least 1,100 K. Thus, the net incident radiative flow at the walls containing the load to be heated, received by the heating element, relative to the difference in heating element/walls temperatures raised to the fourth power, is high. This additional radiative flow can thus degrade the uniformity of the transfer to the load.

One solution, described here with respect to FIG. 2, consists of installing an exchanger 150 in the chamber. The oxidant circulates in this exchanger. The preheating obtained in this way allows the stability of the flameless combustion to be further improved, while re-homogenizing the transfer to the load, for an equal level of performance. It has been estimated that a preheating of the air of the order of 700 K can be obtained with such an exchanger. As the combustion is highly diluted, preheating the combustion air has only a minor effect on nitrogen oxide emission levels.

Figure 3:
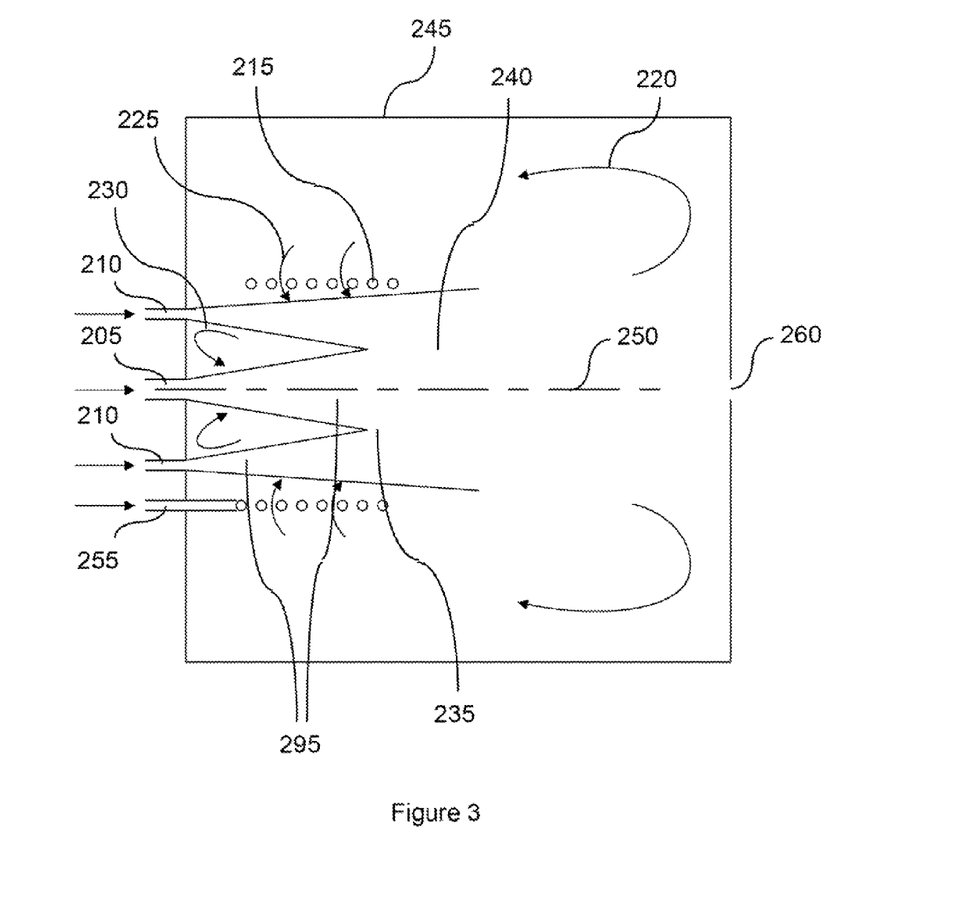
FIG. 3 is a diagram of a longitudinal view of a combustion chamber equipped with the heating element for stabilizing flameless combustion and FIG. 4 represents a variant of the device illustrated in FIG. 3 comprising a means of preheating air by recovering the radiative flow emitted by the heating element.

FIG. 3 is a diagram of a longitudinal view of a combustion chamber equipped with the heating element for stabilizing the highly dilute flameless combustion, coming from a burner with separate jets of liquid or gaseous fuel, in a cold-wall combustion chamber.

The combustion chamber 245, supplied with fuel 1 and air 2, is a confined area having an axis of symmetry 250 in the case of a fire-tube furnace, for example. The burner is a burner type with separate injection points and a large distance between the jets. The air injection point 205 is located in the center and the fuel is transported on the periphery by two ports 210. As can be seen in FIG. 3, the distance between the central air injection point 205 and the two gas injectors 210 is between 1.5 and 3 times the diameter of the oxidant injector 205 for a combustion with natural gas.

Thus, before the fuel and the oxidant are in contact in 235, they are diluted by recirculated combustion products 230, for the oxidant, and 225, for the fuel. These recirculated combustion products are heated beforehand by the heating element 215, here in the form of a coil surrounding the fuel and oxidant jets 295.

The heating element 215 can be of various types. For example, it can consist of an electrical resistance, a hollow heating element supplied with hot products from an auxiliary combustion, or possibly a combination of the two, depending on the resources available on site.

The sizing and positioning of the heating element 215 allow the exchange surface to be maximized while not introducing any confinement effect for the mixing zone with respect to internal recirculations. As shown in FIG. 3, the flow of products passes between the coils with a moderate loss of load. The spiral pitch is sufficient to limit the loss of load and allow dilution. Conversely, this distance is sufficiently small and the diameter of the coils is sufficiently large as to maximize the heat exchange surface. The heating element 215 is positioned as close as possible to the base of the burner, the wall where the fuel and oxidant emerge. The length, along axis 250, of the heating element 215 allows the heating element to go beyond the position of the point where the fuel and oxidant jets merge. At this level, the diameter of the heating element 215 is such that the heating element 215 is not impacted by the lateral jets. A safety distance of several centimeters is preferable, so as to limit the thermal stresses on the heating element 215 and thus increase its lifespan. Regardless of the energy supply (products of an ancillary combustion or electric power), the material of the heating element 215 allows the convective heat transfer to be maximized and the emitted radiative flow to be minimized. A significant roughness of the order of one millimeter is preferred, so as to increase the convective transfer coefficient. In contrast, a low emissivity, of the order of 0.1, is preferable so as to reduce the loss by radiative transfer.

The velocities of the jets (mainly the oxidant jet) are the source of intense advective movements 220. It has been shown that a recirculation ratio of at least 4 is required in a combustion with natural gas to ensure sufficient dilution in 235. With respect to the sizing of the injection point holes of the burner, these correspond to a speed of the oxidant on output from the injector, preferably equal to at least 30 m/s.

During their recirculation, the combustion products lose a large part of their energy by convection and radiation to the benefit of the load to be heated. This load can be contained in tubes (water-tube furnace or refining furnace) or in a space in which the combustion chamber 245 is immersed (fire-tube furnace).

The heating element 215 is then used to partially compensate for this heat loss by heating the combustion products that recirculate and are involved in diluting the reagents. These combustion products being heated, the temperature in 235 exceeds the self-ignition temperature of the fuel, and the dilute combustion is therefore stable. The dilute combustion develops in area 240 and produces few nitrogen oxides. Finally, the fumes are evacuated from the combustion chamber by the flue 260. The supplying of the heating element 215 is shown in 255.

To ensure sufficient heat transfer, two parameters have to be considered in addition to the exchange surface: the temperature differential between the skin of the heating element 215 and the fumes in contact with it, and the convective transfer coefficient at the wall of the heating element 215. The temperature of the fumes is of the order of 850 K for an industrial fire-tube furnace. It has therefore been estimated that a temperature of at least 1,200 K on the surface of the heating element 215 is preferable, for heating the fumes sufficiently and ensuring a temperature in 235 higher than the self-ignition temperature of the usual fuels. The second parameter influencing the value of the convective transfer coefficient between the heating element 215 and the fumes is the convective transfer coefficient h. This coefficient mainly depends on the speed of the fluid, its viscosity and the roughness of the walls. Among these parameters, one can play mainly on the roughness of the walls. To maximize the energy transmitted to the fluid by the heating element 215, the transfer coefficient and the temperature differential are maximized.

Figure 4:
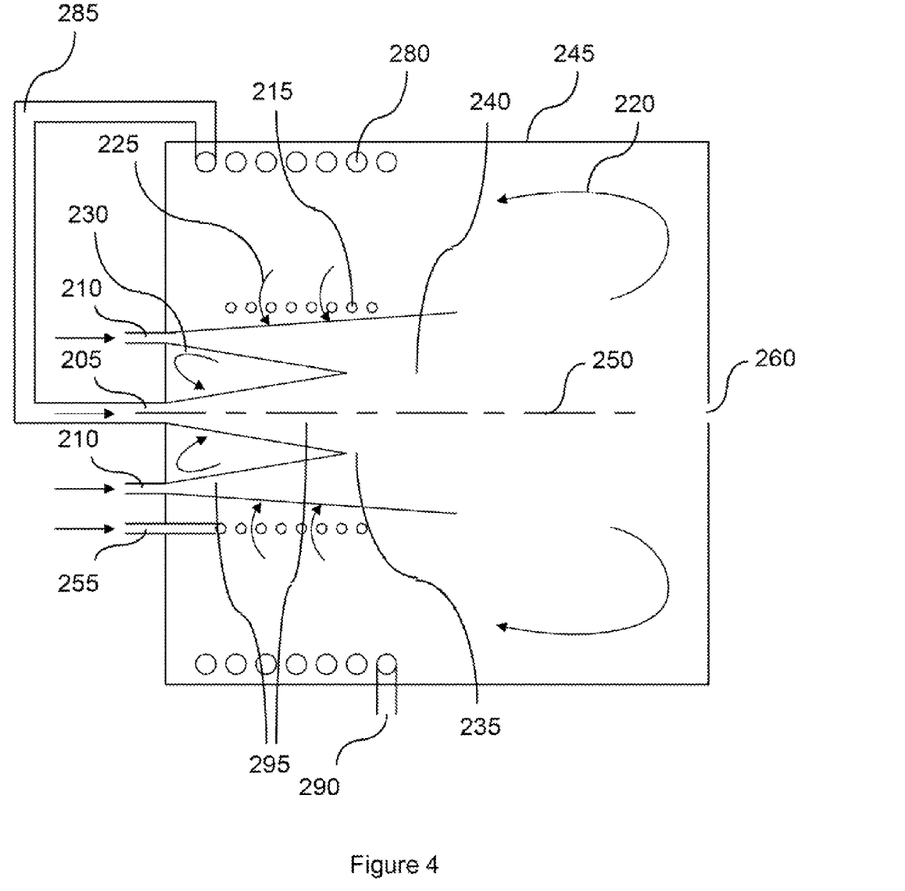

Nevertheless, with a very high temperature at the wall of the heating element 215, a significant portion of the energy dissipated by the heating element 215 will be recovered by the walls of the chamber 245 located opposite the heating element 215, in the form of incident radiative heat flow. In FIG. 4, the radiative flow emitted by the heating element 215 mainly depends on the emissivity coefficient of the material that the heating element 215 is made of and on the temperature differential between the walls of the heating element and the walls containing the load to be heated, raised to the fourth power. It is therefore preferable to use a material with a low coefficient of emission for the heating element 215.

However, with current materials, as the temperature differential is large, it is difficult to reduce the incident radiative flow on the walls containing the load to a negligible amount. Thus, a loss of the uniformity of the heat transfer, obtained by means of the flameless combustion, can appear.

A variant of the device illustrated in FIG. 3 can comprise a means of preheating air 280 by recovering the radiative flow emitted by the heating element 215. This preheating means 280 can thus be associated with the heating element 215 so as to recover the radiative flow emitted by the heating element 215. Therefore either a radiative screen (not shown), which confines the heat to the inside of the heating unit, or, as in FIG. 4, a heat exchanger 280, which recovers the incident radiative flow coming from the heating element 215 to preheat the combustion air before it enters the chamber 245, is provided. The heat exchanger 280 is installed facing the heating element 215, preferably all around the walls of the furnace. In 290, the fuel enters, cold, into the exchanger, and exits in 285, before being injected into the combustion chamber by inlet 205. Typically, the heating temperature can reach 700 K for combustion with air. This heat exchanger 280 allows further improvements in the combustion stability, while maintaining a uniform transfer to the load and low nitrogen oxide emissions, and all for an equal level of performance. One of these variants is illustrated in FIG. 4.

The stability of the flameless combustion is thus further increased by this preheating of the oxidant, and performance is improved. Finally, the power thus generated by the heating element is recovered in two ways: firstly, by the oxidant via the exchanger and secondly by the recirculated fumes via a conductive-convective exchange.

In variants, a process fluid to be heated is circulated, rather than the combustion air, and the available energy is thus recovered for a use other than preheating the oxidant or fuel.

In the case where the exchanger 280 is replaced by a radiative wall located between the heating element and the walls, the length of this wall is preferably equal to or greater than the length of the heating element.

Simulations have shown a sizing that allows a flameless combustion to be stabilized in a 20 kW pilot furnace. The temperature of the walls of the combustion chamber is of the order of 350 K. The jets of fuel and oxidant are not preheated to begin with. The burner is a burner type with separate jets having a central air injector and two lateral methane injectors. The distance between the jets is twice the diameter of the air jet. The parameters are given in the following table.

The same modeling method as that for an earlier study into flameless combustion in a hot chamber was used. The cold chamber simulations made it possible to show that the chosen geometry—coiled heating element with the dimensions given below—allowed the same operating mode to be kept as that for the burner alone (identical mixture and aerodynamic fields).

Thus the flameless combustion dilution conditions are respected with the presence of the heating element 215. In addition, with a skin temperature of the heating element 215 of the order of 1,200 K, a roughness of 1 mm and a low emissivity of 0.1, heating the fumes that recirculate in the burner zone produced by the heating element 215 makes it possible to find the thermal conditions for stabilizing the combustion in the Air/methane mixing zone.

| Burner | Burner capacity | 20 kW |
|---|---|---|
|  | Aeration rate | 1.1 |
| Combustion chamber | Volume | 0.12 m³ |
|  | Temperature of the internal walls | 350 K |
| Heating element | HE diameter | 8.6 cm |
|  | HE height | 16 cm |
|  | HE/burner base distance | 2.5 cm |
|  | HE temperature | 1200 K |
|  | Diameter of the coils | 4 mm |
|  | Spiral pitch | 6 mm |
|  | Emissivity | 0.1 |
|  | Roughness | 1 mm |

This invention extends to applications for combustion in a cold-wall combustion chamber equipped with a burner comprising an inlet for oxidant and an inlet for fuel (natural gas, process gas, coke oven gas, synthesis gas, etc.). The oxidant and fuel inlets open separately into a furnace at a relative distance allowing the establishment of combustion which is highly diluted (distance between the jets between 1.5 and 3 times the diameter of the oxidant injector and injection speeds between 20 and 100 m/s for a natural gas/air combustion) by internal recirculations of the combustion products towards the burner zone.

Stabilization of the flameless combustion in a cold-wall type of combustion chamber (temperature below 1,000 K) is obtained by using a solid heating element (electrical resistance or heating tube supplied with products heated by combustion or an auxiliary system) located at the base of the burner and surrounding the oxidant/fuel jets. This spiral-shaped element heats the combustion products, before they reach the burner zone where they are mixed with, firstly, the oxidant and, secondly, the fuel. The oxidant and fuel are injected separately. Thanks to the fumes being heated by the heating element, the temperature in the fuel/oxidant mixing zone thus exceeds the mixture's self-ignition temperature.

The velocities of the jets are high in order to generate intense recirculations of the combustion products towards the burner. Typically, for an air/natural gas combustion, the speed of the air entering the chamber is more than 30 m/s. With this type of burner architecture, the combustion is self-sustained subject to having a temperature in the diluted fuel/diluted air mixing zone that is higher than the self-ignition temperature of the mixture.

The heating element, having heated the combustion products before mixing with the reagents, produces, at the point where the jets of oxidant and fuel meet, a hot zone (temperature higher than the self-ignition temperature) with a dilution such that the oxygen content is of the order of 5 to 8%, instead of 20% for non-diluted air. Combustion, highly diluted in this way, is then generated and self-sustained by self-ignition according to the flameless combustion principle.

In order to ensure sufficient dilution, the recirculation ratio (defined as the ratio of the recirculated flow rate to the sum of the injected flow rates) is greater than four for flameless combustion with natural gas, for example. This condition is ensured by the high speeds of the reagents coming out of the injectors.

In addition to purely technical constraints (ease of installation, ease of maintenance, cost), the two constraints concerning the heating element are: firstly, for the flow not to be confined to the mixing zone, thus allowing the reagents to be sufficiently diluted by the recirculated products, while being sufficiently close to the mixing zone. And, secondly, to maximize the convective heat transfer between the heating element and the recirculated fumes taking part in the dilution, while avoiding hot points (temperature below the temperature limit for the exponential rise in the rate of thermal nitrogen oxide production).

It is noted that several forms of heating element can be used: coil, grids, burner tube with multiple perforations, radiant burner, etc. For each case, sizing is done so as to allow a maximum exchange surface and a minimum loss of load for the crossing of the heating element. In the case of the coiled heating element, the important dimensions are the diameter of the heating element, its length, its spacing relative to the burner base, the diameter of the coils and the spiral pitch. The heating element thus makes it possible to overcome the conflict between high temperature and high dilution in the recirculated products/oxidant/fuel mixing zone. As the apparatus does not change the burner's aerodynamic properties, the main properties of highly dilute combustion are obtained: the nitrogen oxide emissions are reduced, the reaction zone is distributed in volume, heat generation is more uniform, the flame is less sensitive to thermo-acoustic instabilities and the temperature peaks are less intense.

The invention claimed is:

1. A device for stabilizing dilute combustion for use in a cold-wall type of combustion chamber, comprising:
   a burner comprising at least one oxidant inlet and at least one fuel inlet, the oxidant and fuel inlets opening separately into the combustion chamber at a distance for establishing combustion, the burner is configured to internally re-circulate combustion products toward a burner zone to provide the dilute combustion; and
   a heating element, positioned in a dilution zone and surrounding a set of oxidant and fuel jets, configured to heat the dilution zone during steady operating conditions to maintain self-ignition conditions.

2. The device according to claim 1, wherein the heating element comprises an electrical resistance.

3. The device according to claim 1, wherein the heating element comprises a heating tube supplied with heated products via an auxiliary combustion, the combustion products or intermediary fluid.

4. The device according to claim 1, wherein the heating element comprises a multi-perforated tube supplied with the combustion products.

5. The device according to claim 1, wherein the heating element is located at a base of the burner.

6. The device according to claim 1, wherein the heating element is configured to maintain a temperature of the heated combustion products in recirculation below a temperature limit for an exponential rise in a rate of thermal nitrogen oxide production.

7. The device according to claim 1, further comprising a preheating device for preheating air by recovering the radiative flow emitted by the heating element.

8. The device according to claim 7, wherein the preheating device is a heat exchanger located inside the combustion chamber opposite the heating element, the heat exchanger configured to recover a portion of a power supplied by the heating element transferred in the form of a radiative flow to cold walls of the combustion chamber and the heat exchanger configured to transfer at least a portion of the recovered power to at least one of oxidant or fuel.

9. The device according to claim 7, wherein the preheating device is a heat exchanger located inside the combustion chamber opposite the heating element, the heat exchanger configured to recover a portion of a power supplied by the heating element transferred in the form of a radiative flow to cold walls of the combustion chamber, and the heat exchanger configured to transfer at least a portion of the recovered power to a fluid load to be heated.

10. The device according to claim 7, wherein the preheating device is a radiative wall located inside the combustion chamber between the heating element and cold walls.

11. The device according to claim 1, wherein the oxidant and fuel inlets comprise injection holes of predetermined diameters to provide oxidant and fuel speeds for supporting a dilute combustion.

12. A cold-wall type of combustion chamber comprises a device for stabilizing dilute combustion according to claim 1.

13. A furnace comprising a device according to claim 1.

* * * * *